United States Patent
Violi

[11] Patent Number: 5,552,578
[45] Date of Patent: Sep. 3, 1996

[54] OVEN WITH EXCESS STEAM TREATMENT DEVICE

[75] Inventor: Raymond Violi, Marlens, France

[73] Assignee: Societe Cooperative de Production Bourgeois société coopérative de production anonyme à capital variable, Faverges, France

[21] Appl. No.: 321,796

[22] Filed: Oct. 12, 1994

[30] Foreign Application Priority Data

Oct. 12, 1993 [FR] France ............................ 93 12381

[51] Int. Cl.⁶ .................................................. A47J 27/04
[52] U.S. Cl. .......................... 219/401; 126/20; 126/369; 99/467
[58] Field of Search .................................. 219/401, 682; 126/20, 20.1, 20.2, 369; 99/451, 467, 516

[56] References Cited

U.S. PATENT DOCUMENTS

| | | | |
|---|---|---|---|
| 4,010,349 | 3/1977 | Lee | 219/401 |
| 4,173,215 | 11/1979 | Burgeau et al. | 219/401 |
| 4,281,636 | 8/1981 | Vegh et al. | |
| 4,392,049 | 7/1983 | Bentley et al. | 219/401 |
| 4,698,487 | 10/1987 | Mgister | 219/401 |

FOREIGN PATENT DOCUMENTS

| | | |
|---|---|---|
| 0092851 | 11/1983 | European Pat. Off. . |
| 0388751 | 9/1990 | European Pat. Off. . |
| 378963 | 6/1907 | France . |
| 2458260 | 1/1981 | France . |
| 2176695 | 1/1987 | United Kingdom . |
| 2218328 | 11/1989 | United Kingdom . |

*Primary Examiner*—Philip H. Leung
*Attorney, Agent, or Firm*—Ratner & Prestia

[57] ABSTRACT

An oven for cooking foodstuffs includes an airtight enclosure having an opening closed by a door. Water condensing in the enclosure is collected in the lower part of the enclosure and discharged into discharge pipes. An excess steam circuit captures excess steam escaping from the enclosure and feeds the captured steam to a treatment system including a steam condenser to convert it into liquid condensates. The liquid condensates are collected and discharged into discharge pipes. At least one heater heats steam passing through it in the excess steam circuit on the upstream side or on the downstream side of the steam condenser.

13 Claims, 3 Drawing Sheets

OVEN WITH EXCESS STEAM TREATMENT DEVICE

BACKGROUND OF THE INVENTION

1. Field of the Invention

The present invention concerns ovens for cooking foodstuffs having an airtight enclosure with an opening closed by a door and, optionally, a steam generator device and pipes for feeding the steam produced by the steam generator device into the airtight enclosure.

2. Description of the Prior Art

Conventional steam ovens have the advantage that cooking is faster in the moist atmosphere.

The quantity of steam produced during cooking must be controlled to maintain the steam pressure at a sufficiently high level for correct cooking and at a sufficiently low level to prevent excessive escape of steam into the surrounding atmosphere. Controlling the production of steam is difficult, in particular because of the inertia of the steam generator device. As a result, in conventional steam ovens steam escapes either via the water discharge pipes or into the atmosphere through a steam vent pipe provided for this purpose. The escaping steam pollutes the atmosphere, in particular by causing an unacceptable increase in the relative humidity in the surrounding area and by producing mist and water droplets. Escape of steam via the water discharge pipes requires a sealed connection, which is difficult to achieve, overheats the pipes, which causes premature ageing thereof, and disturbs certain flows of fluids; it is therefore to be avoided.

Steam also escapes from ovens with no steam generator, when cooking foodstuffs with a high water content.

The problem addressed by the present invention is that of preventing or very substantially reducing the escape of steam from the oven via the water discharge pipes connected to the drains and to prevent escape of steam from the oven into the surrounding atmosphere causing condensation on the walls of the room containing the oven.

Another aim is to favor the evacuation or elimination of grease and condensates leaving the oven.

SUMMARY OF THE INVENTION

To achieve these and other objects the invention consists in an oven for cooking foodstuffs including an airtight enclosure having an opening closed by a door with condensed water capture means for collecting in the lower part of said enclosure water condensing in said enclosure and discharging same into discharge pipes, an excess steam circuit for capturing excess steam escaping from said enclosure and feeding the captured steam to treatment means including steam condenser means to convert it into liquid condensates, means for collecting said liquid condensates and for removing them in discharge pipes, said treatment means including at least one heater adapted to heat steam passing through it in the excess steam circuit on the upstream side or on the downstream side of the steam condenser means.

The heater can advantageously be adapted to heat the steam passing through it to a temperature between 300° C. and 500° C.

In one embodiment of the invention the excess steam circuit includes an upper orifice in the upper part of the enclosure connected to an excess steam pipe to convey excess steam taken from the upper part of the enclosure to a connection orifice in a condensation box in the lower part of the oven.

In another embodiment of the invention the excess steam circuit includes a lower orifice in the lower part of the enclosure to collect excess steam and water condensing in the lower part of the enclosure, this lower orifice being connected to an excess steam pipe to convey the steam and the water collected to a connection orifice in a condensation box in the lower part of the oven and containing water maintained at a predetermined level.

The steam condenser means can advantageously include a condensation box with two compartments one on top of the other and separated by an apertured intermediate wall, with means for feeding water into the lower compartment and for maintaining it at a predetermined level. The upper compartment includes the orifice connected to the excess steam pipe and contains members having thermal inertia and forming chicanes, for example a pile of volcanic rocks. The lower compartment includes a siphon connected to the discharge pipe and adapted to carry off excess liquid above the predetermined level. Means are provided for feeding cold water and spraying it onto the rocks to cool them at predetermined periods.

Other objects, features and advantages of the present invention will emerge from the following description of specific embodiments of the invention given with reference to the appended drawings.

DETAILED DESCRIPTION OF THE PREFERRED EMBODIMENTS

Figure 1:
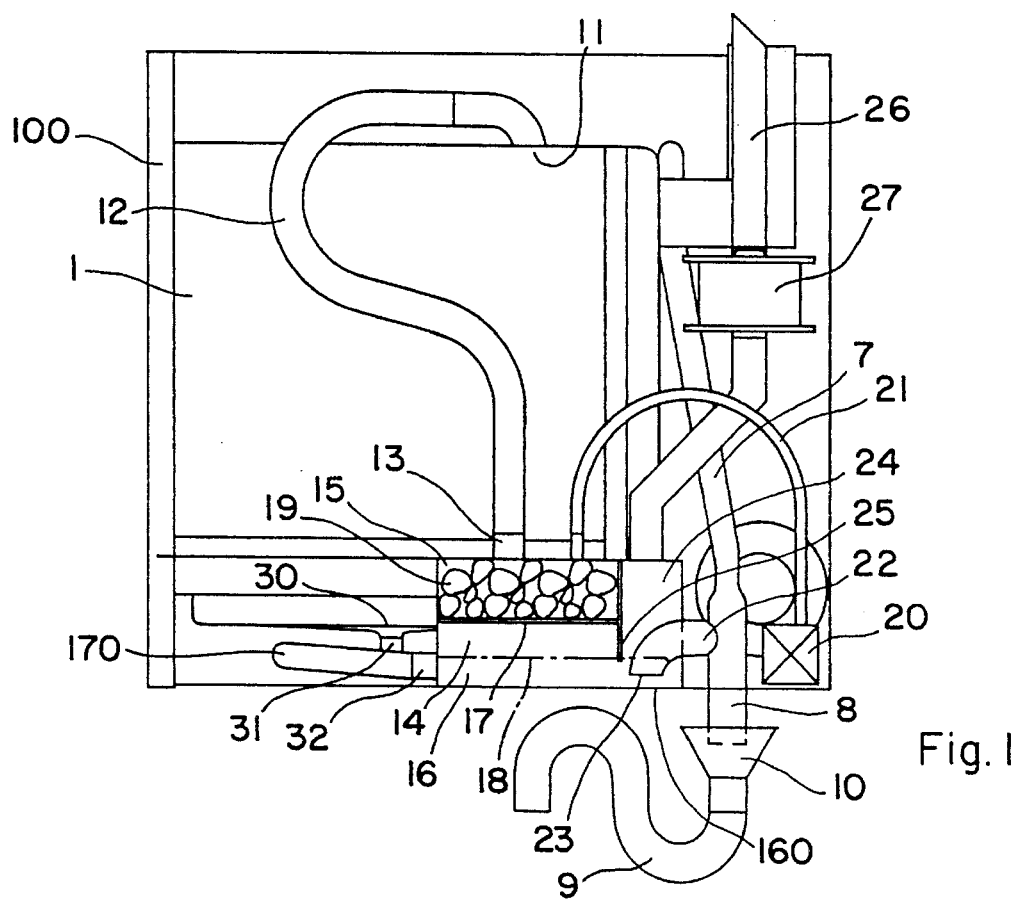
FIG. 1 is a right-hand side view showing the main parts of an oven of the invention provided with a device for evacuation of excess steam.

In the embodiments of the invention shown in the drawings a steam oven of the invention includes an airtight enclosure 1 with an opening closed by a front door 100 shown diagramatically. A steam generator device 2 produces steam and feeds it into the airtight enclosure 1 through steam feed pipes (not shown).

The steam generator device includes, for example, a main steam production enclosure 3 communicating with a secondary enclosure 4 for regulating the level of water in the generator. The lower portions of the two enclosures 3 and 4 communicate via a lower pipe 5 with a drain pump 6 of the steam generator. The drain pump 6 of the steam generator is in the lower part of the oven and discharges into a drain pipe 7 forming a half-loop whose top is in the upper area of the oven and whose end 8 is connected to discharge pipes 9 by a connection 10. The connection 10 is not sealed, comprising (for example) a funnel into which liquid is discharged from the end 8 of the drain pipe 7.

The present invention enables the use of a connection 10 that is not sealed because negligible quantities of steam escape via the drain pipe 7.

To this end, the oven of the invention includes an excess steam circuit including at least one orifice in the wall of the airtight enclosure 1 and connected to an excess steam pipe to convey excess steam to a connection orifice in a condensation box 14 in the lower part of the oven and containing water maintained at a predetermined level 18.

In a simplified embodiment of the invention the orifice is a lower orifice 31 in a receptacle 30 in the lower part of the enclosure 1 to collect both excess steam and condensed water flowing into the lower part of the enclosure. The lower orifice 31 is connected to a pipe 170 to convey excess steam and condensed water to a connection orifice 32 in the condensation box 14.

In the embodiments shown separate means are advantageously provided for collecting condensed water and for collecting and treating excess steam. To this end, in addition to the lower orifice 31 collecting condensed water, an upper orifice 11 is connected to an excess steam pipe 12 conveying excess steam to a connection orifice 13 of the condensation box 14. The excess steam pipe 12 must have a large transverse cross-section, for example an inside diameter between 3 cm and 10 cm.

The condensation box 14 of the embodiments shown has two compartments 35 and 16 one on top of the other and separated by an apertured intermediate wall 17.

The lower compartment 16 is associated with water feed means (not shown) adapted to feed water into the lower compartment 16 and to maintain a constant water level as shown by the chain-dotted line 18. Water can advantageously be fed into the lower compartment 16 each time that water is fed into the steam generator 2. A branch pipe from the water feed to the steam generator 2 can be used for this purpose.

The upper compartment 15 includes the connection orifice 13 to which the excess steam pipe 12 is connected. The upper compartment 15, adapted to condense the steam, contains members having thermal inertia and forming chicanes. In an advantageous embodiment of the invention the upper compartment 15 contains rocks 19, for example porous volcanic rocks.

A solenoid valve 20 and a water feed pipe 21 feed and spray cold water onto the rocks 19 to cool them at predetermined periods. For example, cold water is fed onto the rocks 19 each mime that water is fed into the steam generator 2 by providing an appropriate branch pipe from the water feed to the steam generator 2.

In accordance with the invention, means are further provided for separating the liquids and the uncondensed steam leaving the condensation box 14. To this end the lower compartment 16 includes a siphon 22 connected to the drain pipe 7 and adapted to convey excess liquid and condensate above the predetermined level 18. For example, the condensate outlet siphon 22 comprises a bent tube whose inlet orifice 23 faces downwards and is at a level below the predetermined level 18 and near the bottom 160 of the lower compartment 16, its other end being connected horizontally to the drain pipe 7 and the lower part of its bend being at the predetermined level 18.

As shown in the figures, the condensation box 14 can advantageously include an auxiliary chamber 24 delimited by a vertical wall 25 extending downwardly from the upper wall of the condensation box 14 to a point below the predetermined level 18, the space below the wall 25 constituting a passage for the liquids and the steam passing through it. The siphon 22 is in the auxiliary chamber 24, as shown in the figures, and its inlet orifice 23 is advantageously lower than the lower edge of the wall 25.

In the embodiment shown in FIG. 1 the upper area of the auxiliary chamber 24 is connected to a steam outlet pipe 26 adapted to vent to atmosphere excess steam which has possibly passed through the condensation box 14 without being condensed. The steam outlet pipe 26 advantageously incorporates a heater 27. The heater 27 is adapted to heat strongly the steam flowing in the steam outlet pipe 26, separating the water molecules and simultaneously destroying grease and other substances conveyed by the steam. This entirely eliminates the condensation of steam in the room containing the oven.

Figure 2:
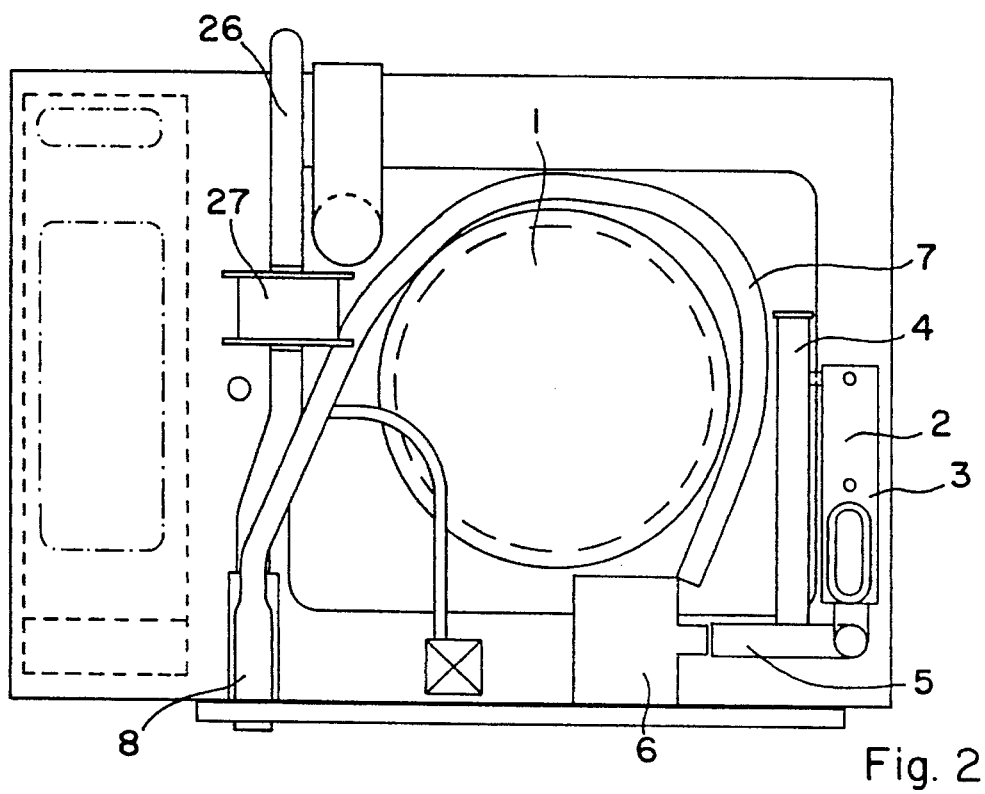
FIG. 2 is a rear view of the oven from FIG. 1.
Figure 3:
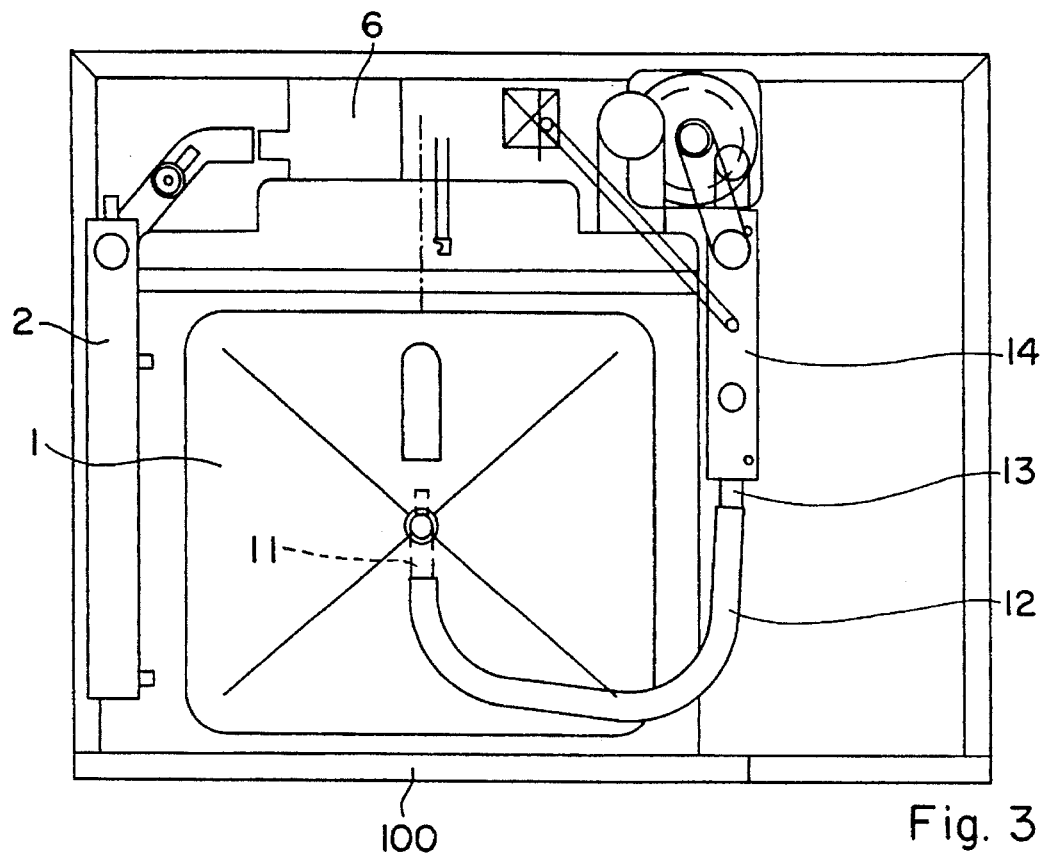
FIG. 3 is a top view of the oven from FIG. 2.

In the embodiment of FIGS. 1 to 3 the heater 27 is on the downstream side of the condensation box 14 in terms of the direction of flow of steam in the excess steam circuit. This embodiment may be preferred when escape of steam into the surrounding atmosphere is acceptable.

Figure 4:
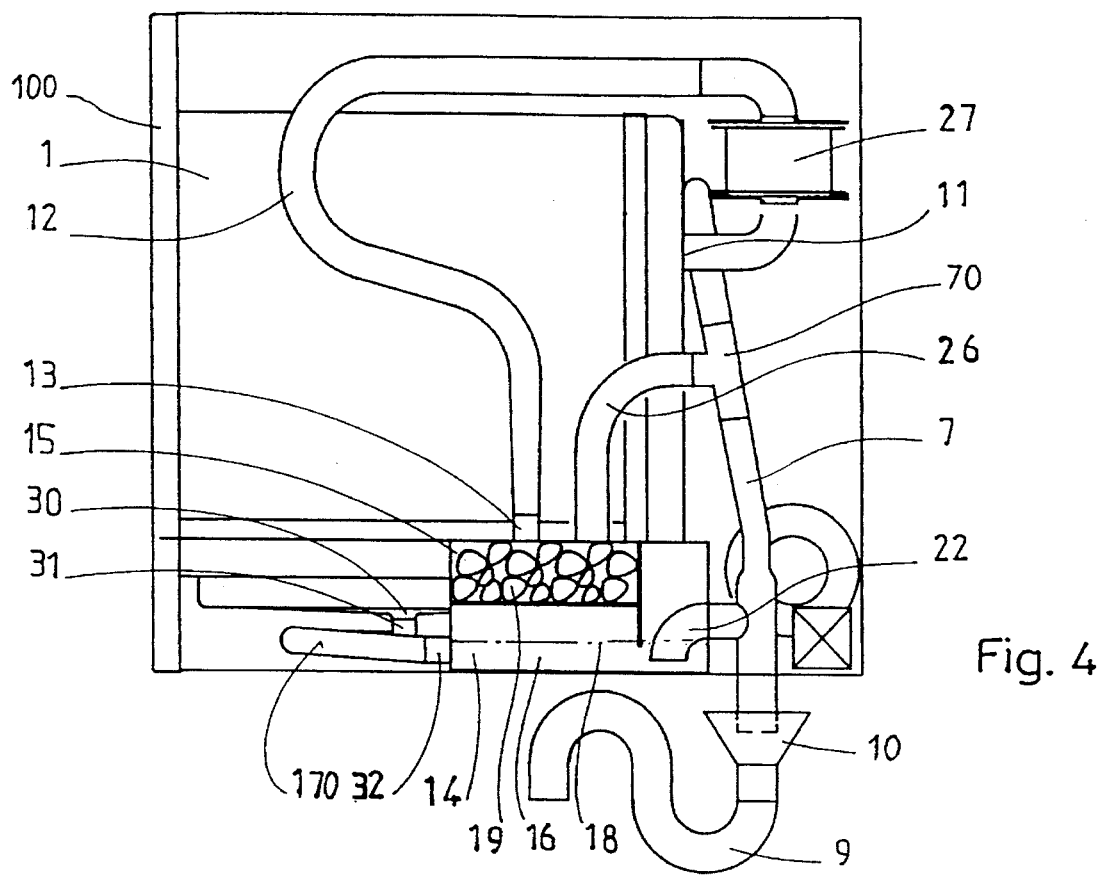
FIG. 4 is a right-hand side view of a second embodiment of an oven in accordance with the present invention.
Figure 5:
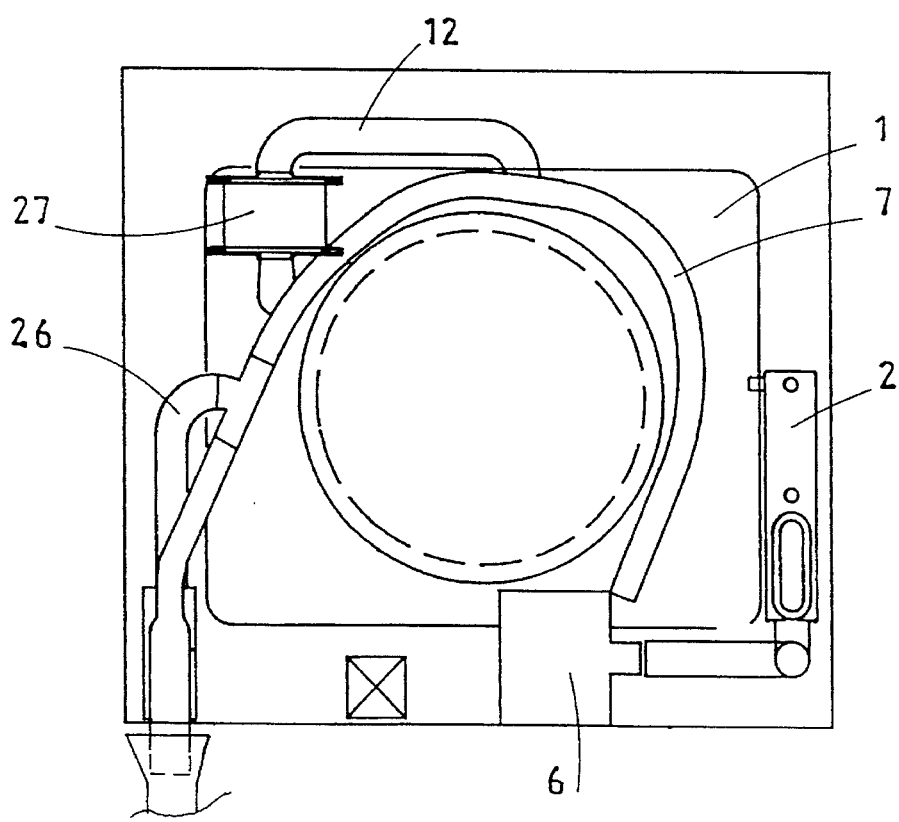
FIG. 5 is a rear view of the oven from FIG. 4.

In the embodiment of FIGS. 4 and 5, on the other hand, a heater 27 is installed in the excess steam circuit on the upstream side of the steam condenser means. This embodiment may be preferred when no escape of steam into the surrounding atmosphere is allowed.

In this second embodiment the excess steam pipe 12 conducts the steam from an upper orifice 11 to a connection orifice 13 on the condensation box 14. A heater 27 is inserted into this excess steam pipe 12. The condensation box 14 also contains water in its lower compartment 16, up to the predetermined level 18, while its upper compartment 15 contains rocks 19. The condensate outlet siphon 22 connects the lower compartment 16 to the drain pipe 7 in turn connected to the discharge pipe 9, as in the previous embodiment.

A first end of a steam outlet pipe 26 is connected to an orifice in the upper wall of the first compartment 15 of the condensation box 14. Its second end is connected to an intermediate area 70 of the drain pipe 7. The intermediate area 70 is advantageously higher than the connection of the siphon 22. No steam escapes into the atmosphere. Surprisingly, the presence of the heater 27 reduces the quantity of steam passing through the condensation box 14 and also heating of the condensation box 14 itself and the water it contains.

In the above embodiments the water draining from the steam generator flows back, at the end of cooking, into the drain pipe 7 via the drain pump 6 of the steam generator. Because the drain pipe 7 is connected to the condensate outlet pipe (the siphon 22) and to the steam outlet pipe, the flow of drained water aspirates water and condensates present in the condensation box 14 via the siphon 22.

Figure 6:
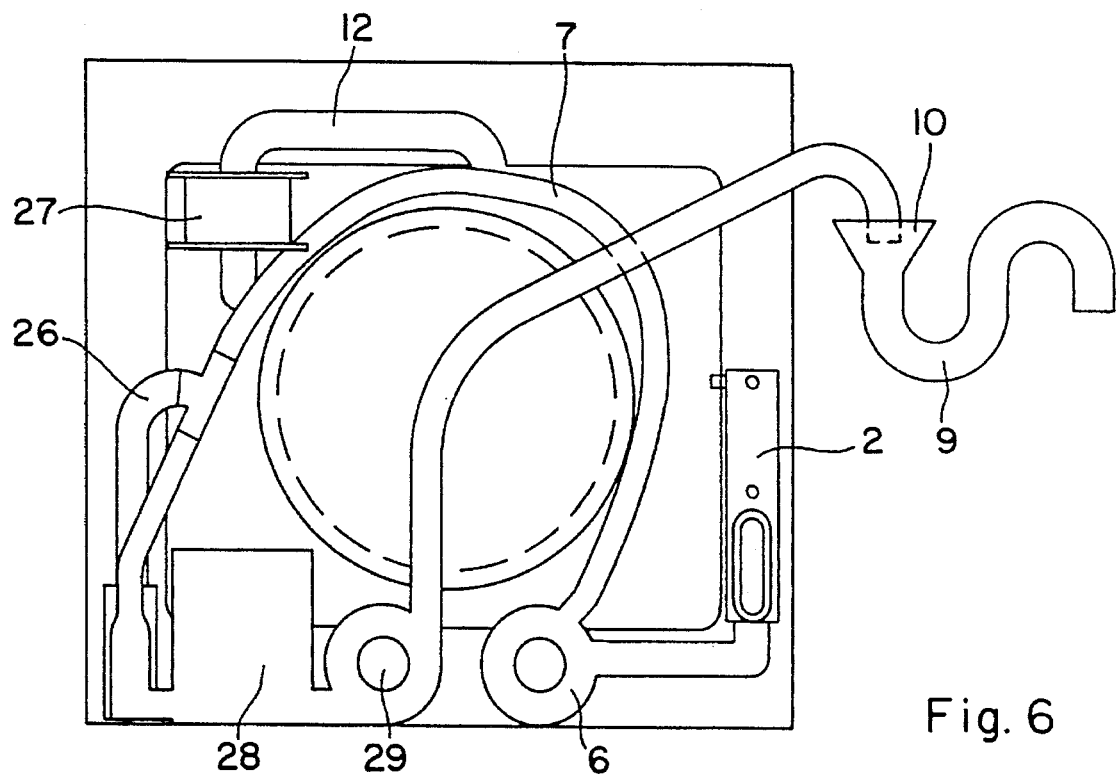
FIG. 6 is a rear view of a third embodiment of an oven in accordance with the present invention.

FIG. 6 shows another embodiment of oven in which the drain pump 6 used to drain off the contents of the steam generator 2 discharges into the drain pipe 7 which feeds the water into an outlet storage tank 28 connected to the discharge pipes 9 by a second drain pump 29 which can feed discharge pipes 9 at a higher level than the oven. The drain pipe 7 is connected to the condensate outlet siphon (not shown) and to the steam outlet pipe 26. This embodiment enables the oven to be lower than the outlet of the discharge pipes 9, combined with the use of an orifice 10 in the form of a funnel.

In a simplified embodiment the condensation box 14 can include a single compartment containing cold water fed at predetermined periods to cool it. Steam that is not condensed is then extracted from the condensation box 14 through a steam outlet pipe 26 fitted with a heater 27.

In all the embodiments described thus far, the heater 27 can be an enclosure containing electrical heater element means and means to favor the exchange of heat with the steam. The temperature inside the heater can advantageously be from 300° C. to 500° C. Good results are obtained using, for example, a stack of porous volcanic rocks heated by the electrical heater element means and through which the steam passes.

In another embodiment the condensation box 14 can be a heat exchanger passing to the steam generator thermal energy recovered from the condensing steam.

The present invention is not limited to the embodiments specifically described but encompasses various variants and generalizations thereof within the scope of the following claims.

There is claimed:

1. Oven for cooking foodstuffs including an airtight enclosure having an opening closed by a door, steam generator means for conducting steam to said enclosure, condensed water capture means in communication with a lower part of said enclosure for collecting water condensing in said enclosure and discharging the water into at least one discharge pipe, an excess steam circuit in communication with said enclosure for capturing excess steam escaping from said enclosure and feeding the captured steam to treatment means in communication with said excess steam circuit including steam condenser means to convert the steam into liquid condensates, means for collecting said liquid condensates and for removing them in said at least one discharge pipe, said treatment means including at least one heater for heating steam passing through it, said at least one heater disposed in the excess steam circuit on the upstream side or on the downstream side of the steam condenser means.

2. Oven according to claim 1 wherein said at least one heater comprises a heater which heats steam passing through it to a temperature between approximately 300° C. and 500° C.

3. Oven according to claim 1 wherein said excess steam circuit includes an upper orifice in an upper part of said enclosure and connected to an excess steam pipe to convey excess steam collected from the upper part of said enclosure to a connection orifice in a condensation box in the lower part of the oven.

4. Oven according to claim 3 wherein said condensation box is connected to a steam outlet pipe to vent to atmosphere excess steam not condensed in said condensation box.

5. Oven according to claim 4 wherein said steam outlet pipe includes said at least one heater.

6. Oven according to claim 3 wherein said excess steam pipe includes said at least one heater.

7. Oven according to claim 1 wherein said excess steam circuit includes a lower orifice in the lower part of said enclosure to collect excess steam and water condensed in the lower part of said enclosure, said lower orifice being connected to a pipe to convey the collected steam and water to a connection orifice in a condensation box in the lower part of the oven and containing water maintained at a predetermined level.

8. Oven according to claim 1 wherein said steam condenser means include a condensation box with two compartments one' on top of the other and separated by an apertured intermediate wall with means for feeding water into the lower compartment and for maintaining it at a predetermined level.

9. Oven according to claim 8 wherein the upper compartment of said condensation box includes said orifice for connection to said excess steam pipe and contains rocks.

10. Oven according to claim 8 wherein said condensation box includes a siphon connected to a drain pipe and adapted to carry away excess liquid above said predetermined level, the inlet of said siphon facing downwards and being at a level lower than said predetermined level and near the bottom of said lower compartment.

11. Oven according to claim 10 comprising means for feeding cold water into said condensation box at predetermined periods to cool it.

12. Oven according to claim 1 including a drain pump and drain pipes for draining water contained in said steam generator means and to feed it into said at least one discharge pipe, said drain pipes being connected to a condensate outlet pipe to aspirate the content of said steam condenser means during draining and to a steam outlet pipe to vent excess steam not condensed in said steam condenser means.

13. Oven according to claim 1 including a first drain pump and drain pipes for draining water in said steam generator means and to feed it into an outlet storage tank connected to said at least one discharge pipe by a second drain pump enabling output into said at least one discharge pipe at a higher level than the oven, said drain pipes being connected to a condensate outlet pipe to aspirate the contents of said steam condenser means during draining and to a steam outlet pipe to vent excess steam not condensed in said steam condenser means.

* * * * *